US007343506B1

(12) United States Patent  
Fenwick

(10) Patent No.: US 7,343,506 B1
(45) Date of Patent: Mar. 11, 2008

(54) AUTOMATIC POWER MANAGEMENT OF A NETWORK POWERED DEVICE

(75) Inventor: Stephen C. Fenwick, Mountain View, CA (US)

(73) Assignee: Apple, Inc., Cupertino, CA (US)

(*) Notice: Subject to any disclaimer, the term of this patent is extended or adjusted under 35 U.S.C. 154(b) by 378 days.

(21) Appl. No.: 11/060,916

(22) Filed: Feb. 17, 2005

(51) Int. Cl.
G06F 1/26 (2006.01)
(52) U.S. Cl. ..................... 713/340; 713/310
(58) Field of Classification Search ............. 713/340, 713/310
See application file for complete search history.

(56) References Cited

U.S. PATENT DOCUMENTS

| 6,909,943 | B2 * | 6/2005 | Lehr et al. ............ 700/286 |
| 6,996,729 | B2 * | 2/2006 | Volkening et al. ........ 713/300 |
| 7,046,983 | B2 * | 5/2006 | Elkayam et al. ......... 455/402 |
| 2001/0038635 | A1 * | 11/2001 | Rogers ............... 370/419 |
| 2002/0098859 | A1 * | 7/2002 | Murata ............... 455/522 |
| 2005/0110618 | A1 * | 5/2005 | Creff et al. ............ 340/333 |

OTHER PUBLICATIONS

Dave Dwelley, "New Power for Ethernet-The LTC4255 Delivers", (Part 1 of a 3-Part Series), Design Features, Linear Technology Magazine, Aug. 2002, pp. 9, 10, 11, and 15.

Dave Dwelley, "New Power for Ethernet-Powered Devices", (Part 2 of a 3-Part Series), Design Features, Linear Technology Magazing, Dec. 2002, pp. 9, 10, and 27.

Jacob Herbold, "New Power for Ethernet-Disconnect and Clean Up", (Epilogue to a 3-part series), Design Ideas, Linear Technology Magazine, Dec. 2003, pp. 17-21.

802.3af TM, IEEE Standard for Information Technology, "Part 3: Carrier Sense Multiple Access with Collision Detection (CSMA/CD) Access Method and Physical Layer Specifications" Amendment: Data Terminal Equipment (DTE) Power Via Media Dependent Interface (MDI), IEEE Computer Society, Sponsored by the LAN/MAN Standards Committee, Jun. 18, 2003, pp. 132 total.

* cited by examiner

Primary Examiner—Thuan Du
(74) Attorney, Agent, or Firm—Blakely, Sokoloff, Taylor & Zafman LLP

(57) ABSTRACT

A system delivers power to a powered device through a local area network using a power sourcing equipment to process data of an interconnected network and to receive power from a first power source coupled to the power sourcing equipment. The system may include a powered device coupled at a distance away from the power sourcing equipment through a local area network (LAN) to process the data of the interconnected network through the power sourcing equipment. The powered device may include a modular power over LAN circuit to enable power to the powered device through the LAN when the modular power over LAN circuit is coupled to the powered device.

27 Claims, 16 Drawing Sheets

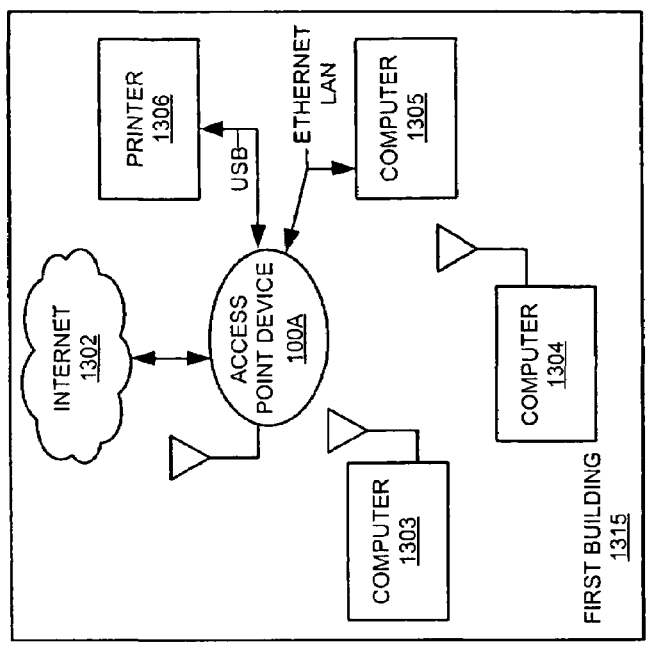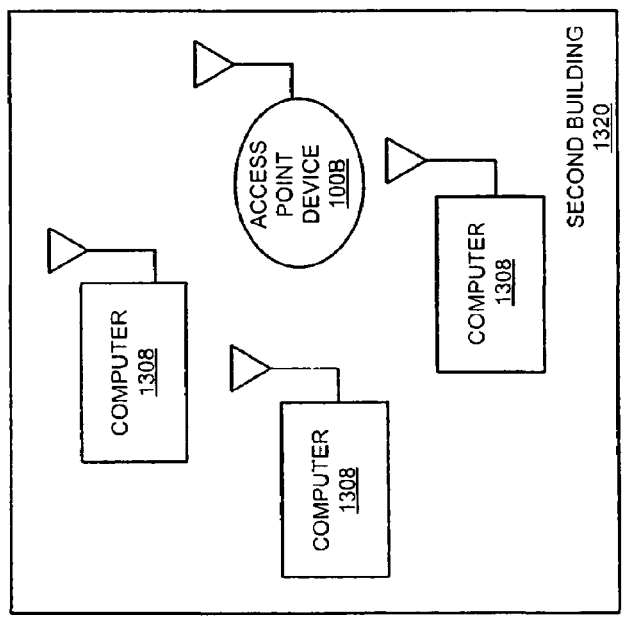
FIGURE 13

AUTOMATIC POWER MANAGEMENT OF A NETWORK POWERED DEVICE

FIELD

Various embodiments relate to powered devices and data processing systems. More particularly, embodiments relate to methods and apparatuses that operate in a data processing network.

COPYRIGHT NOTICE/PERMISSION

A portion of the disclosure of this patent document contains material that is subject to copyright protection. The following notice applies to the software, modules, and data as described below and in the drawings hereto: Copyright © 2005, Apple Computer, Inc., All Rights Reserved.

BACKGROUND

A network involves a number of devices linked together to form a communications system for information and device sharing. Local Area Networks ("LAN") are small (e.g., currently limited to about 500 meters though in the future may be longer), and are commonly deployed in corporate offices to facilitate information transfer. Cities and other metropolitan regions can be connected via Metropolitan Area Networks ("MAN"s). Wide Area Networks ("WAN"s) involve systems communicating across large geographic regions, for example, states and countries. Globally, computers in networks interlink to form "the Internet."

Wireless networking is the use of Radio Frequency ("RF") technology to connect workstations in a LAN and/or LAN's in WAN's. Use of this technology allows for high-speed network links with a limited amount or no wired connections. Wireless networking transmits and receives information over the air. The benefits of wireless networking include increased mobility, flexible installation, and easy scalability. Easy scalability means that wireless networks can support large physical areas by adding wireless access points to boost and extend coverage. Wireless networking also adds the aspect of mobility for laptop users. Since a LAN may have wireless capabilities, a user needs to be within a RF range of an access point device, instead of physically connected to an electrical power outlet through a cable.

Electronic devices (e.g., an internet phone, a building appliance such as a smoke detector, a computer, a data processing equipment, a networking device, etc.) may receive electrical power from an external source (e.g., an electrical power outlet, a 9V or other size batteries, etc.). Certain types of electronic devices (e.g., which may be access point devices such as base stations, modems, routers, etc.) connect wireless network devices of a wireless network to the wired network. Wireless network devices may communicate with each other by transmitting and receiving signals on a specific frequency of the radio band through one or more devices. Wireless network devices may have wireless adapters and/or PC cards ("wireless interfaces") to provide direct wireless connection to each other and/or through electronic devices. In one example, an electronic device may be an Airport Express™ manufactured by Apple Computer, Inc., which combines a shared wireless Internet connection, music streaming, printing, and wireless bridging capabilities into a single, portable size mobile unit to use in various environments, for example, in homes, businesses, and campuses around the world.

A local power source (e.g., an electrical power outlet physically near to the electronic device or an internal battery) is usually required to deliver power to the electronic device. Without a dependable local power source, a particular electronic device may not be able to communicate with the network and/or provide any transmission and bridging functionality to other devices. Furthermore, if power is delivered from a non-local power source, problems such as energy waste, delay, and service interruptions may arise.

SUMMARY

Apparatuses and methods are described for automatic power management of a network powered device. In one aspect, a system delivers power to a powered device through a local area network using a power sourcing equipment which also processes data of an interconnected network and to receive power from a first power source coupled to the power sourcing equipment. The system may include the powered device connected at a distance away from the power sourcing equipment through a local area network (LAN) to process the data of the interconnected network through the power sourcing equipment. The powered device may include a modular power over LAN circuit to enable power to the powered device through the LAN when the modular power over LAN circuit is coupled to the powered device.

In one aspect, an optionally powered subsystem of the powered device may be altered (e.g., altered meaning disabled and/or enabled) (e.g., or may disable at least one port and/or function) when the powered device receives power through the LAN. In addition, an isolation circuit (e.g., an optical isolation circuit) of the powered device may be used to control the operation of a converter and/or power conversion circuit of the powered device. The powered device may draw power from a local power source when the modular power over LAN circuit is not coupled to the powered device or power is otherwise unavailable from the LAN (e.g., the power sourcing equipment is overloaded such that the maximum amount of power which it can distribute is already being distributed). In another aspect, a power source detection and control circuit of the powered device may transmit a LAN power disable control signal when power is received through the local power source. Furthermore, a report generator module of the powered device may create at least one detailed summary report of activity monitored by the power source detection and control circuit, where the at least one detailed summary report is transmittable to at least one interested party.

The powered device may include a converter of the powered device coupled to the power source detection and control circuit to transform an input voltage to an output voltage when the modular power over LAN circuit is coupled to the powered device and when power is received through the LAN. In one aspect, the converter may be disabled when power is received through the local power source.

A powered device may include a power source detection and control circuit to transmit a LAN power disable control signal to an optical isolation circuit when power is received through a local power source. The powered device may also include a converter coupled to the optical isolation circuit to transform an input voltage to an output voltage when a modular power over LAN circuit is coupled to the powered device and when power is received through the LAN. In addition, an optionally powered subsystem of the powered device may be disabled (e.g., or may disable power to at least one port of the powered device) when the modular power over LAN circuit is coupled to the powered device and when power is received through the LAN. In some embodiments, if the local power source is minimal, such as a battery, some functions of the device may only be powered if LAN power is available. The powered device may also include a transmitter circuit to transmit data received from the processing system to at least one wireless device.

In another aspect, a transmitter circuit of the powered device may deliver at least one status report generated by a report generator module of the powered device to the at least one wireless device. The converter may be disabled and power may be directly supplied to a processing system when power is received through the local power source. The powered device may also include an optical isolation circuit to control the operation of the converter. The powered device may draw power from the local power source when the modular power over LAN circuit is not coupled to the powered device. In an alternate aspect, the powered device may, through automatic or other means, preferentially determine how to draw power when both local and LAN power are available. Additionally, power may be supplied through the LAN from a remote power source when the modular power over LAN circuit is coupled to the powered device and the local power source is unavailable.

In one aspect, a method of managing power of a powered device may include automatically detecting power from at least one of a remote power source and a local power source; selecting the remote power source when the local power source is unavailable; and conserving power by disabling at least one port and/or function of the powered device when the remote power source is selected. The method may also transmit data indicating a status of at least one of the remote power source and the local power source to at least one interested party (e.g., at least one of a wireless device and/or a power sourcing equipment). The method may restrict power from the remote power source when a modular power over local area network (LAN) circuit is disconnected from the powered device. The method may disable an internal converter and supply power directly to a processing system when power is received from the local power source. Furthermore, the method may control an internal power converter using an optical isolation circuit.

The present invention describes systems, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

FIG. 13 is a network view of the access point device in a first building communicating with another access point device in a second building, according to one embodiment.

DETAILED DESCRIPTION

Embodiments will be described with reference to numerous details set forth below, and the accompanying drawings. The following description and drawings are illustrative and are not to be construed as limiting. Numerous specific details are described to provide a thorough understanding of various embodiments. However, in certain instances, well known and/or conventional details are not described in order to not unnecessarily obscure various embodiments.

Reference throughout the specification to "one embodiment", "another embodiment", and/or "an embodiment" means that a particular feature, structure, and/or characteristic described in connection with the embodiment is included in at least one embodiment. Thus, the appearance of the phrases "according to one embodiment" and/or "may" in various places throughout the specification are not necessarily all referring to the same embodiment. Furthermore, the particular features, structures, and/or characteristics may be combined in any suitable manner in one or more embodiments.

Figure 1:
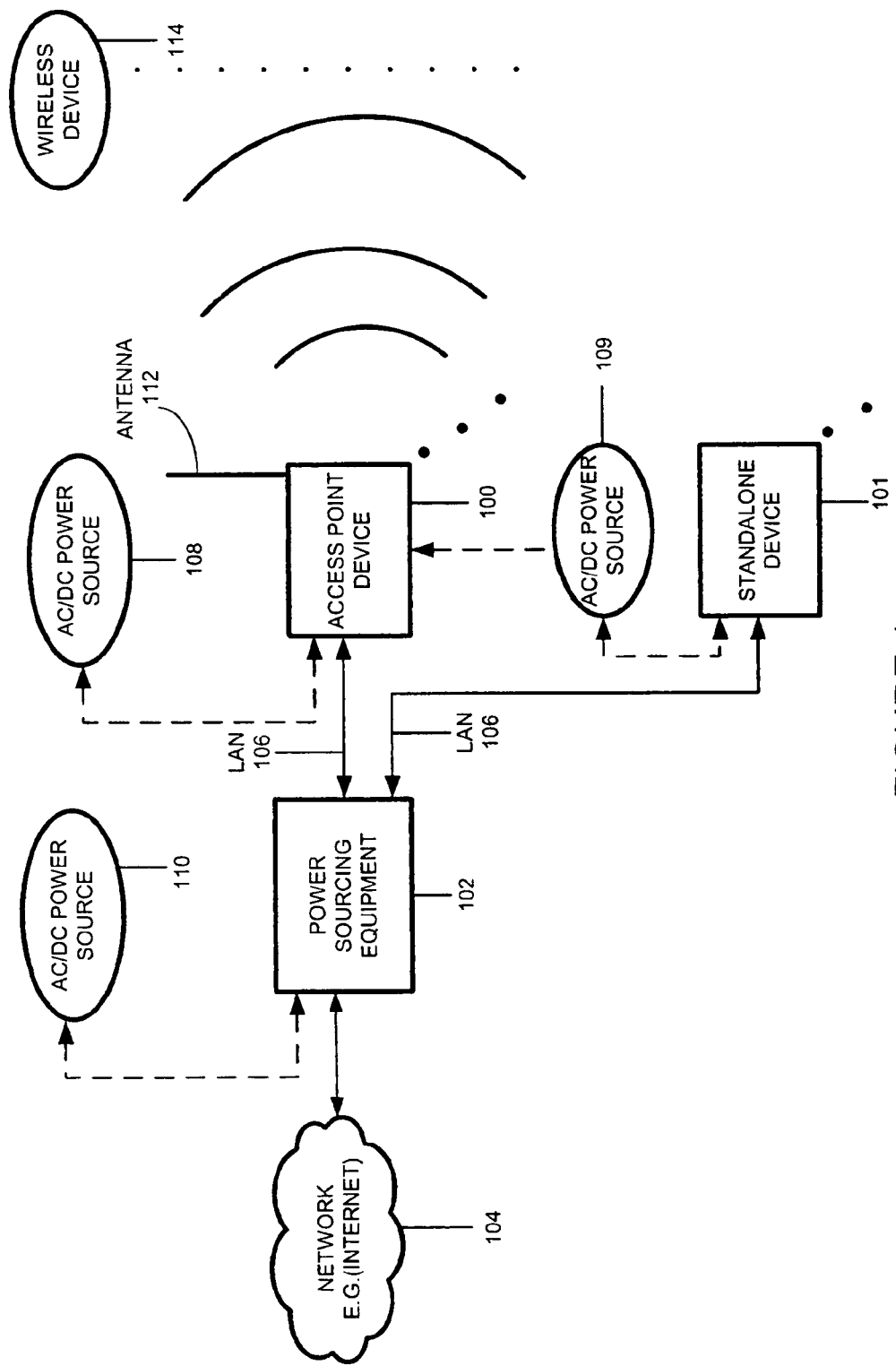
FIG. 1 is a system diagram illustrating powered devices including an access point device and a standalone device connected to a network through a power sourcing equipment, according to one embodiment.

FIG. 1 is a system diagram illustrating powered devices (e.g., an internet phone, a building appliance such as a smoke detector, a computer, a data processing equipment, a networking device, etc. that may receive power from a network and/or an external source) including an access point device 100 and a standalone device 101 connected to a network 104 (e.g., the Internet) through a power sourcing equipment 102, according to one embodiment. In FIG. 1, the power sourcing equipment 102 may be located within and/or be part of a networking element such as a router or bridge or switch (e.g., such as a networking element 907 of FIG. 9). For example, the power sourcing equipment 102 may be part of an Ethernet router. An AC/DC power source 110 (e.g., an electrical outlet such as an 110V/120V outlet) delivers power to the power sourcing equipment 102 (e.g., power could also be supplied by a source integral to the power sourcing equipment 102 such as a solar panel feeding a battery). The power sourcing equipment 102 receives data from the network 104 and transmits data to and from the powered devices (e.g., any number of the access point device 100 and/or any number of the standalone device 101) through the local area network (LAN) 106. The powered devices may be at a distance at most 150 meters away from the power sourcing equipment 102 (e.g., under current LAN length limits, though in the future may be longer). The LAN 106 may be an Ethernet network or other type of local area network.

The LAN 106 may also transmit data received from one or more of the wireless device 114 (e.g., it should be noted that there may be any number of wireless devices communicating with the access point device 100) through an antenna 112 on the access point device 100, and/or through the standalone device 101. For example, if the standalone device 101 is an Internet telephone, the Internet telephone may communicate to/from the Internet (e.g., the network 104) through the LAN 106. In one embodiment, the standalone device 101 may have both access point and standalone device capabilities. For example, the standalone device may be an access point device that also serves the functions of an Internet notification capable building appliance (e.g., a smoke detector, a carbon monoxide detector, a natural gas detector, and/or a combination detector, etc.).

The LAN 106 may also deliver power to powered devices (e.g., the access point device 100, which may be a wireless router, and the standalone device 101) from the power sourcing equipment (e.g., the power may be delivered following a specification such as IEEE 802.3af™ of Jun. 18, 2003). Alternatively, the powered devices (e.g., the access point device 100 and the standalone device 101) may receive power from an AC/DC power source 108 and an AC/DC power source 109 respectively (e.g., electrical outlets such as 110V/120V outlets). In another embodiment, the powered devices may receive power from a battery (e.g., an AA size battery, an AAA size battery, a 9V battery, etc.) In one embodiment, power from the LAN 106 charges a rechargeable battery of a powered device. In another embodiment, the AC/DC power source 108 of the powered device charges the battery of the power sourcing equipment 102. For example, in a network environment, various ones of the access point device 100 and the standalone device 101 may charge up a central rechargeable battery (e.g., a large capacitor or battery) located at the power sourcing equipment 102 (e.g., the powered devices may provide more the rechargeable battery when in power saving mode). The central rechargeable battery may deliver power to the access point devices through the LAN when the access point devices do not have local power available to them. The automatic power management of the powered devices will be described further in FIG. 2A and in FIG. 2B.

Figure 2A:
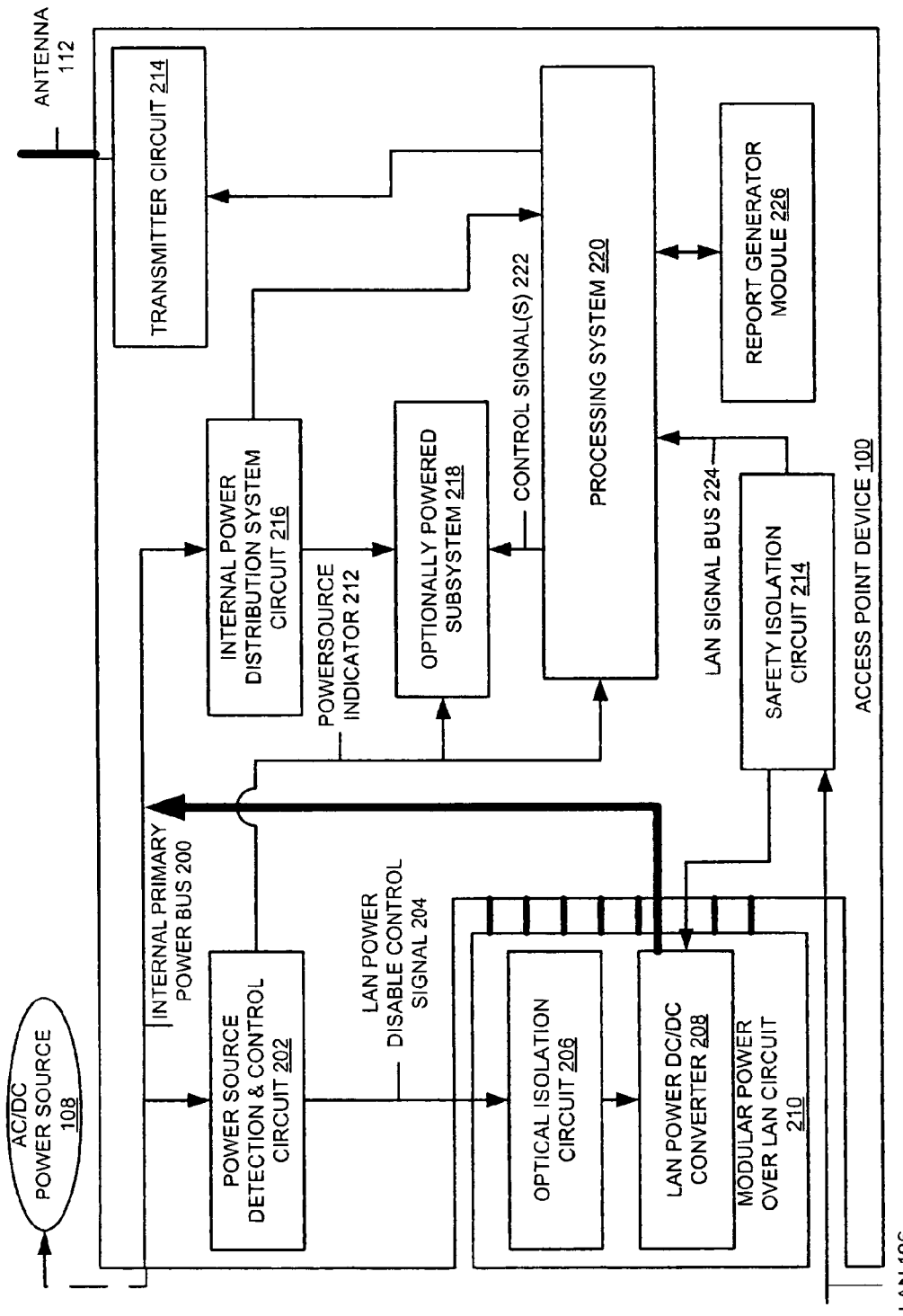
FIG. 2A is a block diagram illustrating the access point device having a modular power over local area network (LAN) circuit including a LAN power DC-DC converter and an optical isolation circuit, according to one embodiment.

FIG. 2A is a block diagram illustrating the access point device 100 having a modular power over local area network (LAN) circuit 210 including a LAN power DC-DC converter 208 and an optical isolation circuit 206, according to one embodiment. The access point device 100 of FIG. 2A may receive power from either the AC/DC power source 108, which is a local source of power, and/or from the power sourcing equipment 102 through the LAN 106 as described previously in FIG. 1. If power is received from the AC/DC power source 108, an internal primary power bus 200 (e.g., the internal primary power bus 200 may be a collection of wires through which power is transmitted from one part of the access point device 100 to another) of the access point device delivers the power to a power source detection and control circuit 202 and an internal power distribution system circuit 216. The local source of power normally delivers only power and thus it does not transmit data to the access point device; further, the local source of power is normally much closer to the access point device than the power sourcing equipment. For example, the local source of power may be only 10-20 feet away from the access point device while the power sourcing equipment may be over 100 feet away.

Figure 3A:
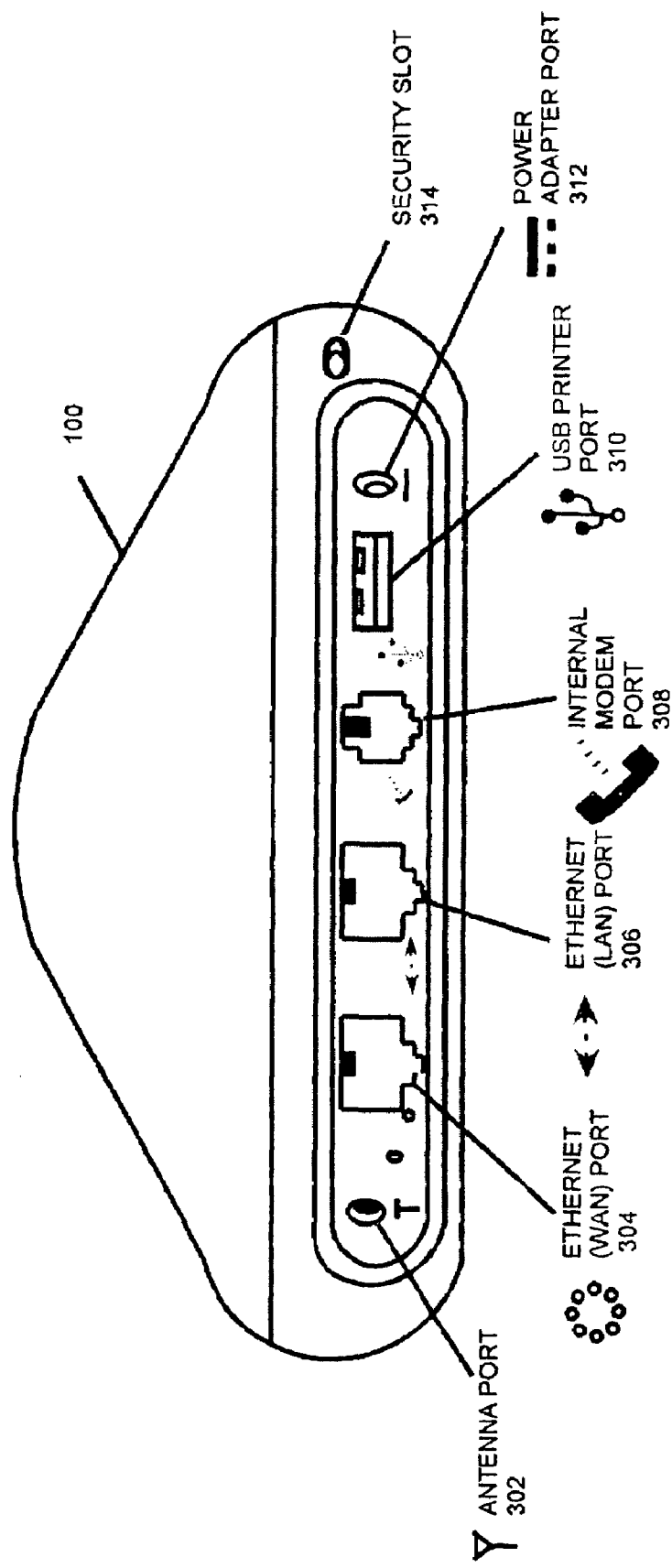
FIG. 3A is a rear view of the access point device, according to one embodiment.

The internal power distribution system circuit 216 may power an optionally powered subsystem 218 (e.g., the optionally powered subsystem 218 may provide power to a number of ports on the access point device 100, such as the internal modem port 308 and the USB printer port 310 as illustrated in FIG. 3A). The internal power distribution system circuit 216 may also deliver power to the processing system 220 when power is received from the AC/DC power source. As described previously, the power source detection and control circuit 202 may also generate a power source indicator 212 and transmit the power source indicator 212 to the optionally powered subsystem 218 and the processing system 220. The processing system 220 may communicate control signal(s) 222 to the optionally powered subsystem 218 to control various functions of the optionally powered subsystem.

In one embodiment, there may be additional communication channels between the processing system 220 and the optionally powered subsystem 218 not shown FIG. 2A (e.g., USB data, interrupts, I2C, or other data/control signals). In another embodiment, the control signal(s) 222 may not be necessary and the power source indicator 212 may be sufficient to control the functions of the optionally powered subsystem 218.

The power source detection and control circuit 202 may detect power from the AC/DC power source 108 and may inform the processing system 220 that power is being received from the AC/DC power source 108 (e.g., "local power") through the power source indicator 212. Based on the power source indicator 212, the processing system 220 may inform a user (e.g., a user of the wireless device 114) when power is being received from the AC/DC power source 108 and when power is being received from the LAN 106 (e.g., by generating at least one detailed summary report using the report generator module 226 of FIG. 2A, such as a user interface view 350 shown in FIG. 3B), so that a user is able to determine when the AC/DC power source 108 is no longer operating. Furthermore, the power source detection and control circuit 202 may allow the access point device 100 to disable and enable power from the LAN 106 to prevent electricity waste by generating a LAN power disable control signal 204 and transmitting this signal to an optical isolation circuit 206 of the modular power over LAN circuit 210.

When the modular power over LAN circuit 210 of FIG. 2A is connected to the access point device 100, the power source detection and control circuit 202 shuts down any power received from the LAN 106 when power is received from the AC/DC power source 108 by transmitting the LAN power disable control signal 204 to the optical isolation circuit 206. In contrast, when power is not received from the AC/DC power source 108, the power source detection and control circuit 202 may not transmit the LAN power disable control signal 204 to the optical isolation circuit 206 of the modular power over LAN circuit 210. If the LAN power disable control signal 204 is not transmitted to the optical isolation circuit 206 of the modular power over LAN circuit 210, and if the modular power over LAN circuit 210 is connected to the access point device 100, power may be delivered to the access point device 100 through the LAN 106. The modular power over LAN circuit 210 is modular because it may be removed (e.g., unplugged from a connector on the access point device 100) from the access point which will still function without the LAN circuit 210, and the LAN circuit 210 may be re-inserted (e.g., plugged into) the access point device.

When the modular power over LAN circuit 210 is connected to the access point device 100 and when no power is received from the AC/DC power source 108 (e.g., the optical isolation circuit 206 of the modular power over LAN circuit 210 does not receive the LAN power disable control signal 204), power is first received into the access point device 100 through the safety isolation circuit 214 (e.g., it should be noted that the LAN 106 may deliver and transmit data to/from the access point device 100 irregardless of whether power is delivered through the AC/DC power source 108 or the LAN 106). The safety isolation circuit 214 ensures that no high voltage is passed to a user (e.g., such as the access point device 100), and may be compliant with a specification (e.g., such as the IEEE 802.3af™ specification). The safety isolation circuit 214 may isolate the user from contact (e.g., by grounding a chassis of the access point device 100 from high voltage) when a local power source (e.g., the AC/DC power source 108) is connected to the access point device 100. The safety isolation circuit 214 may also communicate data and power to the processing system 220 through the LAN signal bus 224. In addition, the safety isolation circuit 214 may deliver power to the LAN power DC-DC converter 208 of the modular power over LAN circuit 210.

When the modular power over LAN circuit 210 of FIG. 2A is not connected, no power can be received through the LAN 106. By allowing the modular power over LAN circuit 210 to physically disconnect) e.g., through a convenient plug and receptacle) from the access point device 100, a standard version of the access point device 100 can be marketed without requiring extra parts and separate components for a version of the access point device 100 with and without power over LAN capability. In one embodiment, receiving power from the AC/DC power source 108 is preferred because it allows the optionally powered subsystem 218 to operate (e.g., the optionally powered subsystem may require more power than the LAN can reliably provide). Alternatively, if the local power source is limited (e.g., a battery recharged by the power sourcing equipment 102) then receiving power over the LAN 106 in addition to the local power source may be required for the optionally-powered subsystem 218 to operate. In another embodiment, receiving power over the LAN 106 is preferred because it allows the access point device 100 to be placed in spaces (e.g., roofs, attics, outer walls, outside, etc.) where no physical power outlet is located nearby to the access point device 100.

The LAN power DC-DC converter 208 may receive power from the power sourcing equipment 102 through the LAN 106 (e.g., "remote power") when the LAN power disable control signal 204 is not received (e.g., no power is being received from the AC/DC power source 108 by the optical isolation circuit 206) and when the modular power over LAN circuit 210 is physically connected to the access point device 100. The LAN power DC-DC converter 208 may transform an input voltage to a voltage required for operation of the processing system 220. (e.g., the LAN power DC-DC converter 208 may transform an input voltage of 48V of an Ethernet local area network (e.g., LAN 106) to an output voltage of 5V that may be required by the internal primary power bus 200).

In one embodiment, if power is received from the AC/DC power source 108, it does not pass through the LAN power DC-DC converter 208 because the AC/DC power source 108 is a 5V power source, and therefore energy loss because of voltage converter inefficiencies can be minimized. In another embodiment, if the AC/DC power source 108 is a 48V power source, then the voltage may pass through a converter (e.g., similar to or the same as the LAN power DC-DC converter 208) to transform the voltage from 48V to the voltage of the internal primary power bus 200 (e.g., 5V).

The optical isolation circuit 206 of the modular power over LAN circuit 210 may physically isolate the LAN power disable control signal 204 to the LAN power DC-DC converter 208 (e.g., the input power generated by the LAN 106 through the safety isolation circuit 214 supplying the LAN power DC-DC converter 208) from possible high voltages in the LAN power DC-DC converter 208. In one embodiment, the optical isolation circuit 206 is a coupler (e.g., an optical coupler, etc.) that provides effective input/output voltage separation. The coupler may be a device which uses light, rather than for example, a coupled magnetic field, to transmit data across an electrical isolation interface. In one embodiment, the coupler may have a Current Transfer Ratio of approximately 1:1 or greater. An optical coupler that is already certified by an appropriate regulatory agency (e.g., U.L.) may be preferred in obtaining overall certification for the product (e.g., approval for use in homes, crawl spaces, etc.)

When power is received from the power sourcing equipment 102 through the LAN 106 (e.g., "remote power"), the internal power distribution system circuit 216 delivers power to the processing system 220 from the LAN 106 (e.g., similarly to when power is received through the AC/DC power source 108). The optionally powered subsystem 218 is not activated because the power source indicator 212 is not received from the power source detection and control circuit 202 when power is received from the power sourcing equipment 102 through the LAN 106. In one embodiment, the LAN 106 may deliver less power than a local power source such as the AC/DC power source 108, and power usage is optimized by disabling at least some ports on the access point device 100 when power is received over the LAN 106.

Figure 3B:
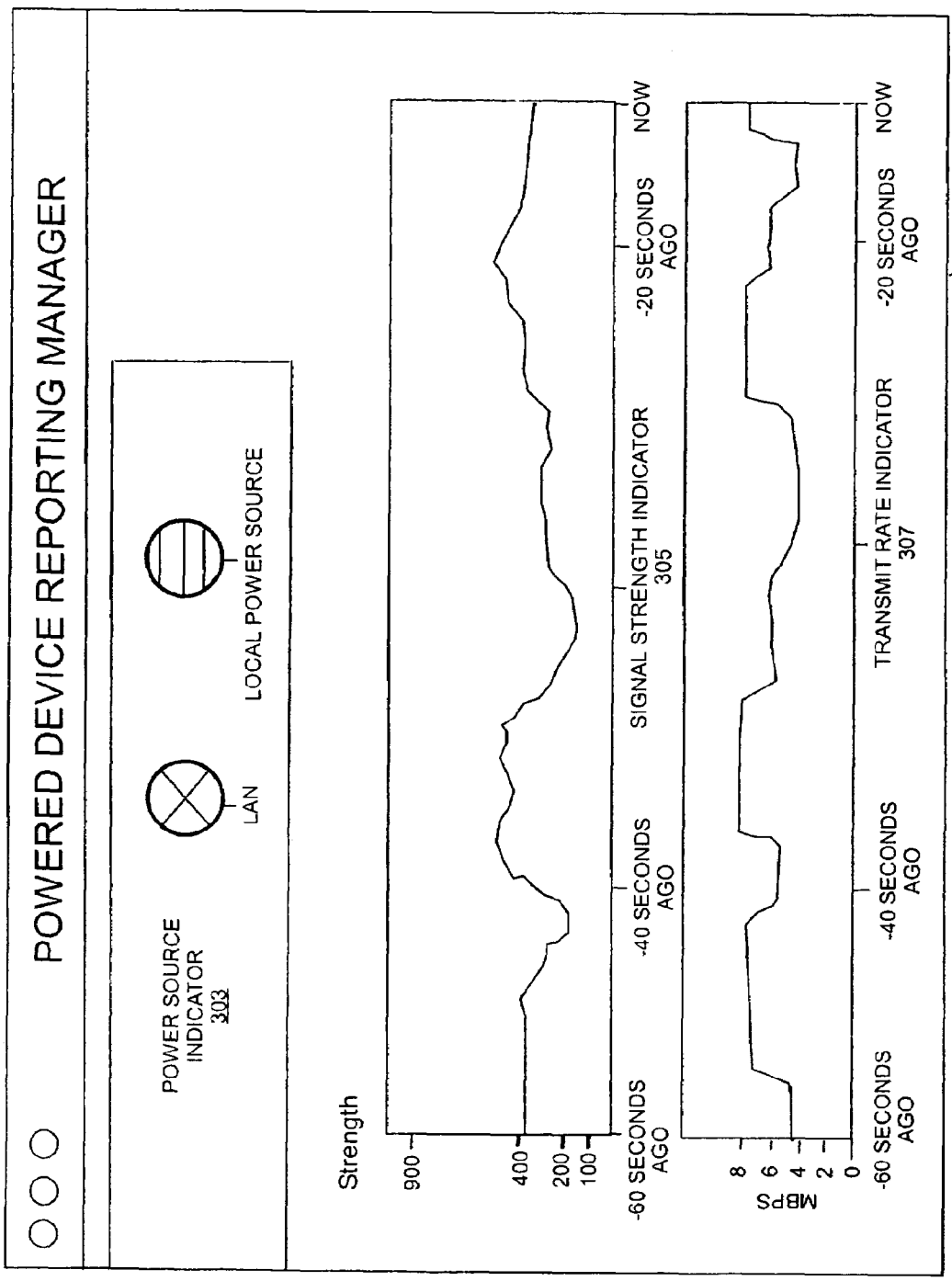
FIG. 3B is a user interface view of a powered device reporting manager that is generated by a report generator module of a powered device, according to one embodiment.

A report generator module 226 may generate at least one detailed summary report and inform a user of the access point device (e.g., a user on the wireless device 114 of FIG. 1) where power is being delivered from. Furthermore, other information may be generated by the report generator module 226 (e.g., status reports) as illustrated in FIG. 3B. The user interface view 350 of FIG. 3B may be the user interface view of an application (e.g., a software application on a machine readable medium) that operates on the wireless device 114 of FIG. 1, and receives information from the report generator module 226 about the status of the access point device 100. A transmitter circuit 214 on the access point device 100 of FIG. 2A transmits and receives data (e.g., the detailed summary reports generated by the report generator module 226, and/or network data) from the network 104 to/from the wireless device 114 and/or other interested parties (e.g., the power sourcing equipment) through the antenna 112 and/or through the LAN circuitry 106.

Figure 2B:
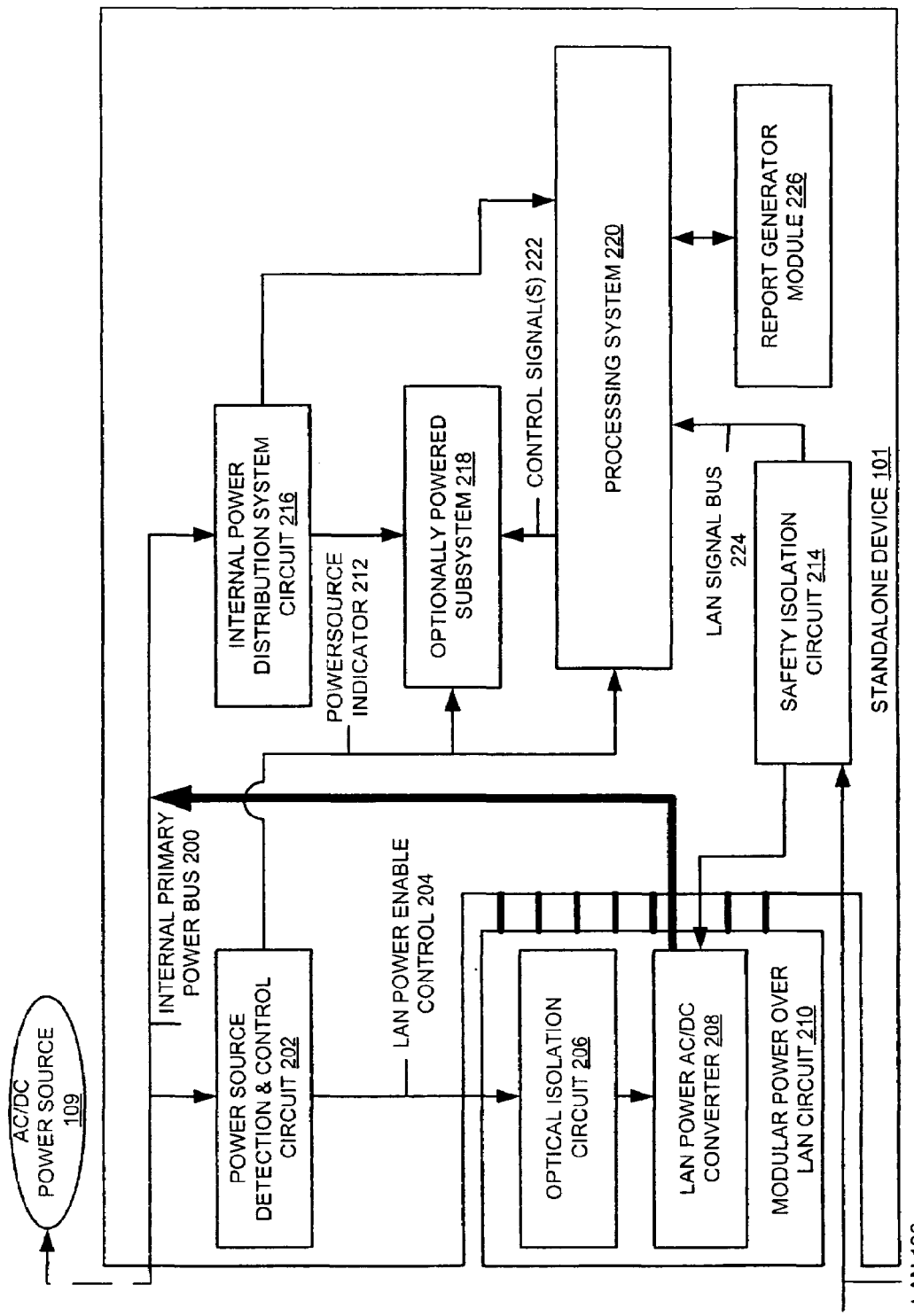
FIG. 2B is a block diagram illustrating the standalone device having the modular power over local area network (LAN) circuit including the LAN power DC-DC converter and the optical isolation circuit, according to one embodiment.

FIG. 2B is similar to FIG. 2A, except that FIG. 2B is a block diagram illustrating the standalone device 101 of FIG. 1 rather than the access point device 100. Particularly, all of the circuitry and modules within the standalone device 101 of FIG. 2B are the same as that of the access point device 100 of FIG. 2A, except that the standalone device 101 of FIG. 2B does not require a transmitter circuit 214 and the antenna 112, because the standalone device 101 is a powered device that does not communicate wirelessly with other devices (e.g., the standalone device 101 may be an Internet appliance, a web phone, a printer, a monitor, a pointing device, a building appliance such as a smoke detector, and/or other input/output device). As such, the standalone device 101 of FIG. 2B may operate similarly to the access point device 100 as discussed in FIG. 2A, and all embodiments of the access point device 100 of FIG. 2A can be applied to the standalone device 101 of FIG. 2B.

FIG. 3A is a rear view of the access point device 100, according to one exemplary embodiment. In FIG. 3A, the access point device 100 includes an antenna port 302, an Ethernet (WAN) port 304, an Ethernet (LAN) port 306, an internal modem port 308, a USB printer port 310, a power adapter port 312, and a security slot 314. The antenna port 302 may connect to the access point device 100 to the antenna 112 of FIG. 2A. The Ethernet (WAN) port 304 may connect the access point device to a wide area network. The Ethernet (LAN) port may connect the access point device 100 to the LAN 106. In one embodiment, power may be delivered from a remote power source, such as the power sourcing equipment 102, through either the Ethernet (WAN) port 304 and/or the Ethernet (LAN) port 306. As described previously, in one embodiment, at least some of the ports illustrated in the access point device 100 of FIG. 3A are part of the optionally powered subsystem 218. Therefore, some of the ports (e.g., the internal modem port 308, the USB printer port 310, and/or the Ethernet (WAN) port 304) may be disabled by the optionally powered subsystem 218 when power is not received from a local power source, such as the AC/DC power source 108.

FIG. 3B is the user interface view 350 of a powered device reporting manager that is generated by a report generator module 226 of a powered device, according to one embodiment. The user interface view 350 displays a power source indicator 303, a signal strength indicator 305, and a transmit rate indicator 307. The power source indicator 303 may illustrate whether power is delivered to a powered device through the LAN 106 or through a local power source (e.g., such as the AC/DC power source 108 and/or AC/DC power source 109). The signal strength indicator 305 may illustrate the strength of a received signal (e.g., signal received by a wireless device 114 from the access point device 100) as a function of time. The transmit rate indicator 307 may indicate the activity between the wireless device 114 and the access point device 100 as a function of time.

Figure 4:
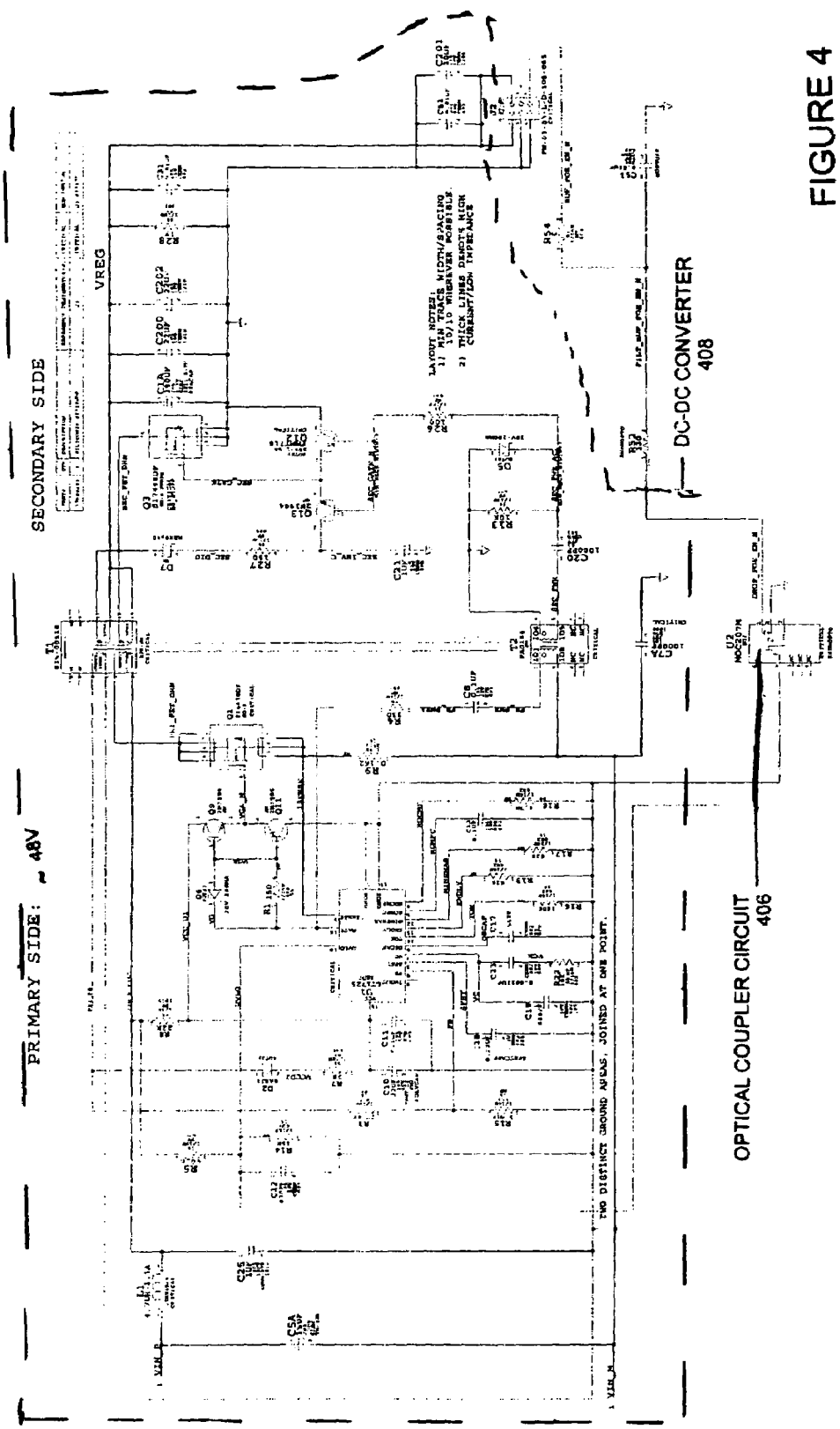
FIG. 4 is a schematic view of the LAN power DC-DC converter and the optical isolation circuit of the powered device, according to one embodiment.

FIG. 4 is a schematic view of the LAN power DC-DC converter and the optical isolation circuit of the powered device, according to one embodiment. In FIG. 4, an optical isolation circuit 406 and a DC/DC converter 408 are illustrated. The optical isolation circuit 406 may be the optical isolation circuit 206 of FIG. 2A, and the DC/DC converter 408 may operate similarly to the LAN power DC-DC converter 208 of FIG. 2A. FIG. 4 illustrates a "primary side" and a "secondary side" of the DC/DC converter 408. The "primary side" may be an input side, such as an input from a LAN 106. The "secondary side" may be the voltage and power level of the internal primary power bus 200. It should be noted that aspects of the schematic view of FIG. 4 such as using a DC-DC controller with a shutdown, and a field effect transistor (FET) at Q3 in place of a simple diode are important to the overall system design to ensure optimal performance (e.g., the FET may be a transistor in which the output current is controlled by a variable electric field) consistent with the various methods and functionalities described in this disclosure.

Figure 5:
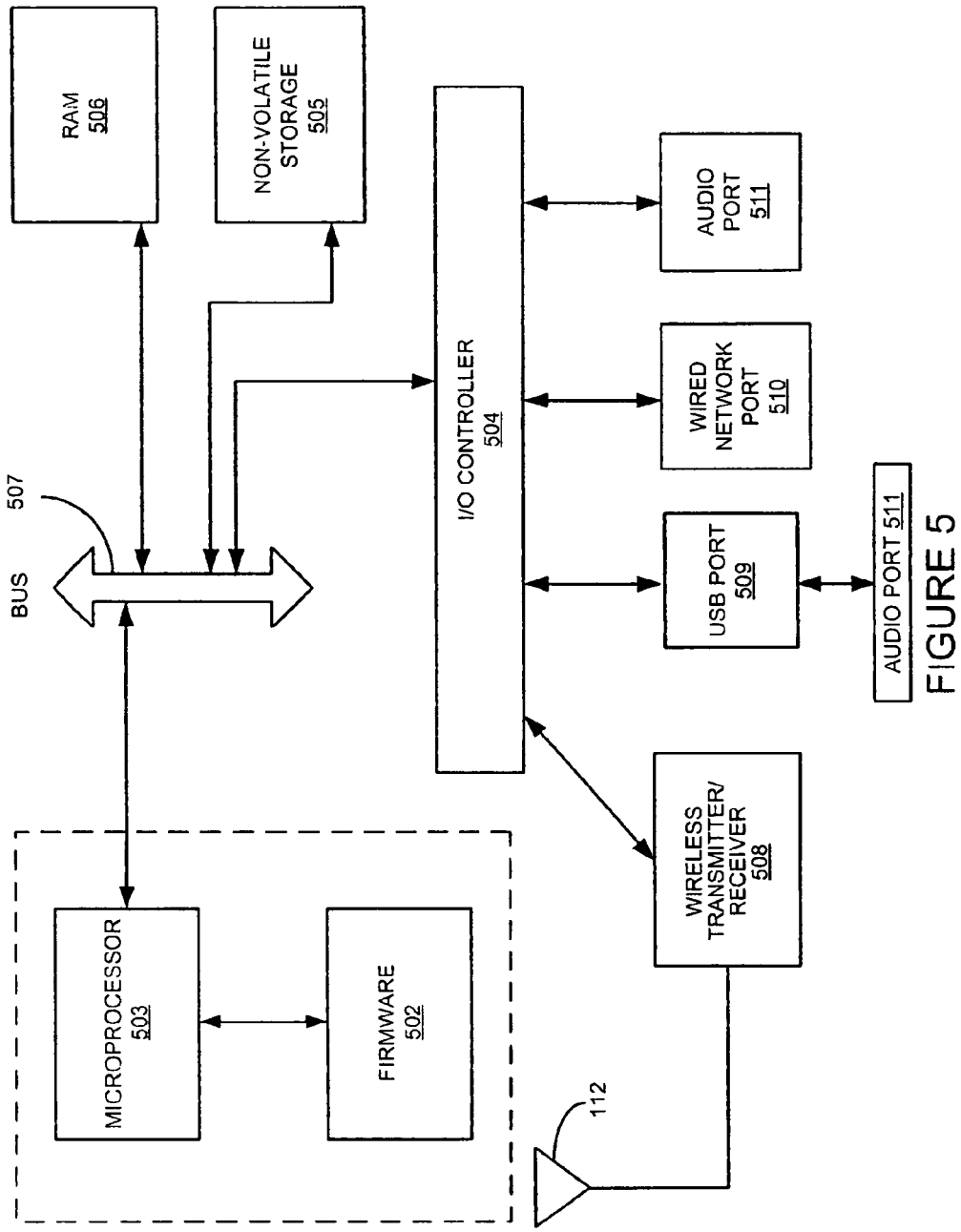
FIG. 5 is a block diagram of a processing system of the powered device, according to one embodiment.

FIG. 5 is a block diagram of a processing system of the powered device, according to one embodiment. FIG. 5 shows a block diagram of the processing system 220 of a powered device (e.g., the access point device 100 and/or the standalone device 101), according to one embodiment. The processing system 220 includes a microprocessor 503 and a firmware 502 connected to a bus 507. The microprocessor 503 may be an integrated circuit, which includes a processor, a random access memory ("RAM"), a read only memory ("ROM"), and input/output ("I/O") ports. The microprocessor 503, when it powers up, executes the firmware 502 to perform methods and functions of the various circuits and modules as discussed in FIGS. 1-14. For an embodiment, the firmware 502 may control the operation of processing system 220 may be stored in non-volatile storage 505 and/or in other places, for example, in a separate memory. As shown in FIG. 5, the microprocessor 503 and the firmware 502 may be connected through a bus 507 to a random access memory ("RAM") 506, a non-volatile storage 505, and an I/O controller 504. The non-volatile storage 505 may be a storage that retains its content when power is turned off. The non-volatile storage 505 may used to store reports for operation of the report generator module 226 of the powered device. For one embodiment, the non-volatile storage 505 may be a flash memory chip, a hard disk, and/or a battery backed memory. For one embodiment, the processing system 220 includes a BCM 4712 system-on-chip integrated circuit produced by Broadcom Corporation, Irvine, Calif. that includes the microprocessor 503, the wireless transceiver 508, and the RAM 506.

For an embodiment, the I/O controller 504 controls a wireless transmitter and receiver ("transceiver") port 508, a USB port 509, a wired network port 510 (e.g., an Ethernet port), and an audio port 511, as shown in FIG. 5. The transmitter and receiver port 508 may be the antenna port 302 as illustrated in FIG. 3A. The wireless transceiver port 508 may connected to the antenna 112 to transmit and receive ("transfer") the information from the port 508 wirelessly, as shown in FIG. 5. For an embodiment, the wired network port 510 may include the Ethernet (LAN) port 306, Ethernet (WAN) port 304, and/or both. For an embodiment, the USB port 509 (e.g., such as USB printer port 310 in FIG. 3A) may connect a printer, and/or other USB peripherals. For an embodiment, the audio port 511 is a line out port that may include a USB interface, and/or other type of connection. For yet another embodiment, the audio port 511 may be connected to the microprocessor 503 through the USB port 509, as illustrated in FIG. 5 by a dashed line.

For an embodiment, the powered device having the microprocessor 503 and the firmware 502 performs a powering on and initialization routine of the processing system 220, and performs scanning at boot time one or more ports of the powered device to identify environmental variables to form an environment description. For each of the interfaces ("I/O ports") the processing system 220 uses respective facilities to identify one or more environmental variables. For example, the processing system 220 may perform wireless network scans on the wireless transceiver port 508 to determine what networks are in the range of the access point device 100. For example, on the wired network port 510, such as the Ethernet port, the processing system 220 determines if there is a link plugged in to the port 510. If there is a link plugged in to the port 510, the profile selector, based on TCP/IP information, determines what kind of network environment is connected to it. For example, on the USB port 509 the processing system 220 may monitor the USB bus to determine what is connected to the USB port 509.

Figure 6:
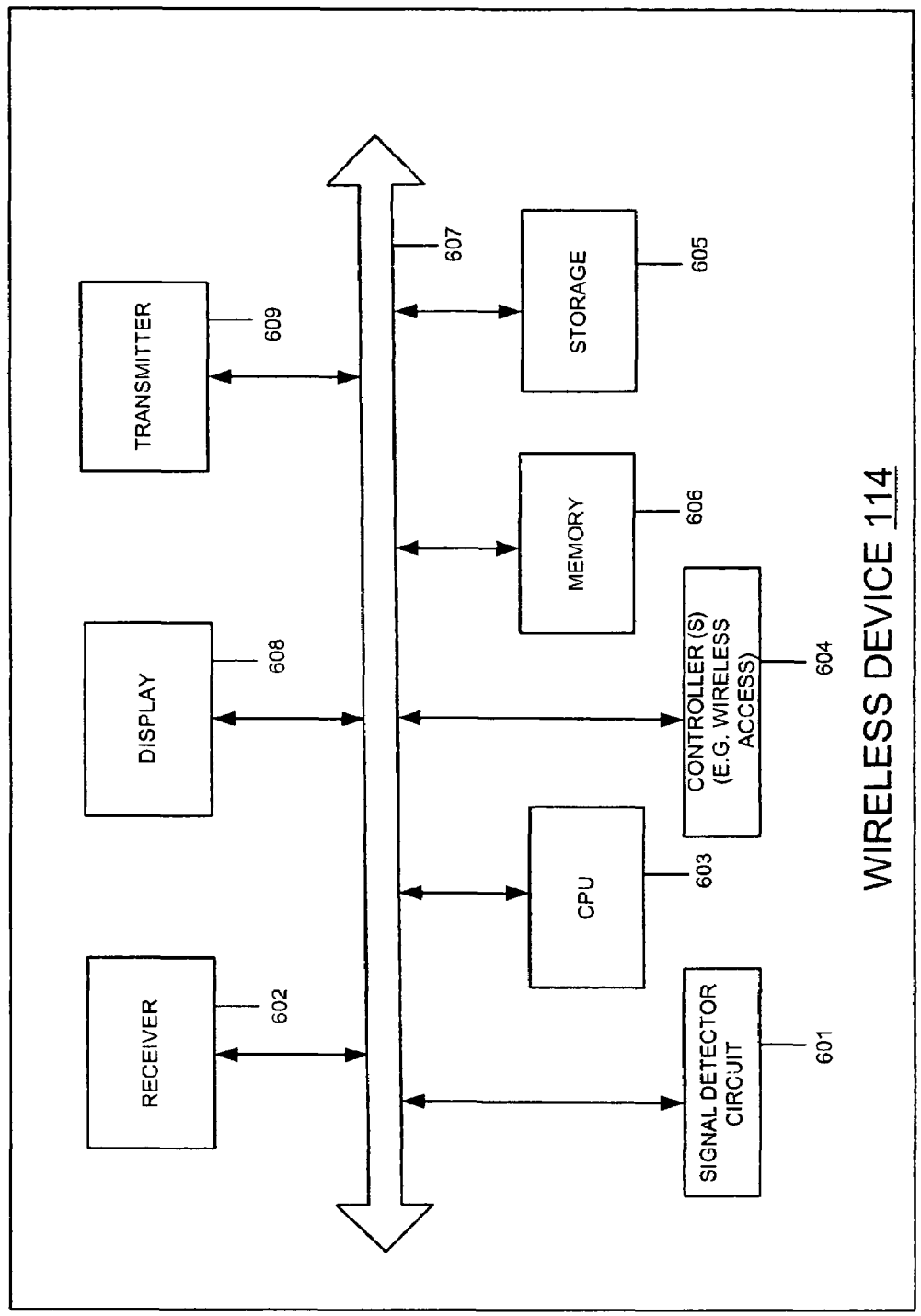
FIG. 6 is a block diagram of a wireless device that receives data from the access point device, according to one embodiment.

FIG. 6 is a block diagram of the wireless device 114 that receives data from the access point device 100, according to one embodiment. The wireless device 114 includes a bus 607 that connects a signal detector circuit 601, a receiver 602, a CPU 603, at least one controller(s) 604, a memory 606, a storage 605, a display 608, and a transmitter 609 to each other. The signal detector circuit 601 receives data from the access point device 100, and may be used to generate the user interface view 350 as shown in FIG. 3B. In one embodiment, the signal detector circuit 601 is a hardware device, that electronically displays power status information for the access point device 100 (e.g., whether power is received through the LAN or through a local power source) using liquid crystal displays (LEDs), or other electronic display components created using standard hardware manufacturing technologies (e.g., CMOS based semiconductor technologies).

Figure 7A:
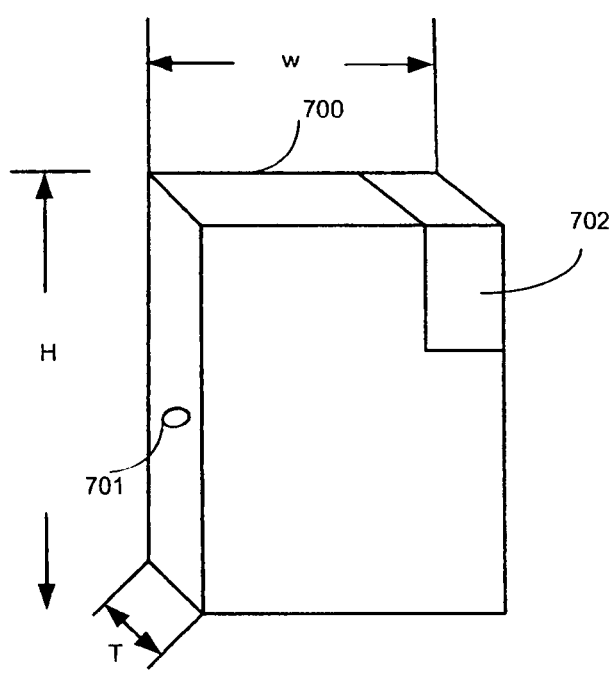
FIG. 7A and FIG. 7B are dimensional views of the powered device in a portable package, according to one embodiment.
Figure 7B:
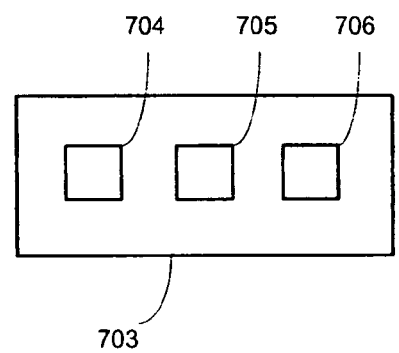

FIG. 7A and FIG. 7B are dimensional views of the powered device in a portable package, according to one embodiment. FIG. 7A and FIG. 7B illustrate the processing system 220 in a package 700 according to one embodiment. The package 700 has a width W, a height H, and a thickness T, as shown in FIG. 7A. For an embodiment, the processing system 220 in the package 700 is a portable handheld device having the width W in the approximate range of 50 mm to 100 mm, the height H in the approximate range of 75 mm-125 mm, and the thickness T in the approximate range of 15 mm to 35 mm. Further, as shown in FIG. 7A, the processing system 220 in the package 700 has a status light indicator 701 and an AC plug adapter 702.

FIG. 7B illustrates a bottom side 703 of the package 700. As shown in FIG. 7B, an Ethernet port 704 for connecting a DSL and/or cable modem, and/or connecting to an existing Ethernet network is located on the bottom side 703 of the package 700. Further, as shown in FIG. 7B, the bottom side 703 includes an USB port 705 for connecting a printer and/or other USB peripherals, a line-out port 706, for example, analog and optical digital audio mini-jack for connecting to one or more audio speakers.

Figure 8:
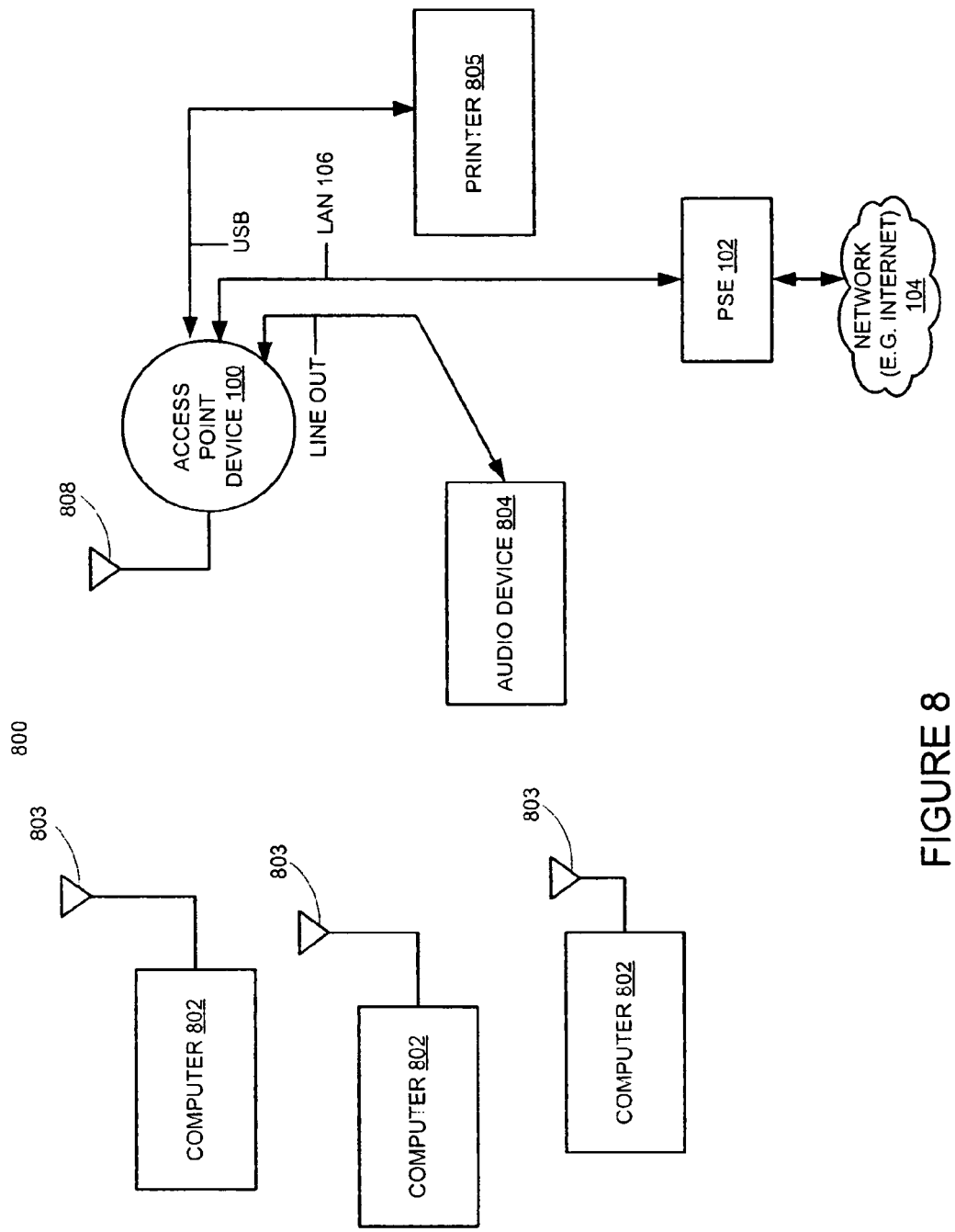
FIG. 8 is a system diagram illustrating the access point device operating with a set of computers in a wireless network environment, according to one embodiment.

FIG. 8 is a system 800 illustrating the access point device 100 operating with a set of computers 802 in a wireless network environment, according to one embodiment. As shown in FIG. 8, the access point device 100 is connected through, for example, an Ethernet (LAN) port (e.g., the Ethernet (LAN) port 306 of FIG. 3A) to power sourcing equipment 102 and the network 104 (e.g., Internet). The access point device creates a wireless network through a wireless interface 808 (e.g., the antenna 112) to client computers 802 having wireless interfaces 803, as shown in FIG. 8. Further, as shown in FIG. 8, the access point device 100 is connected to an audio device 804 using a line-out port.

Figure 9:
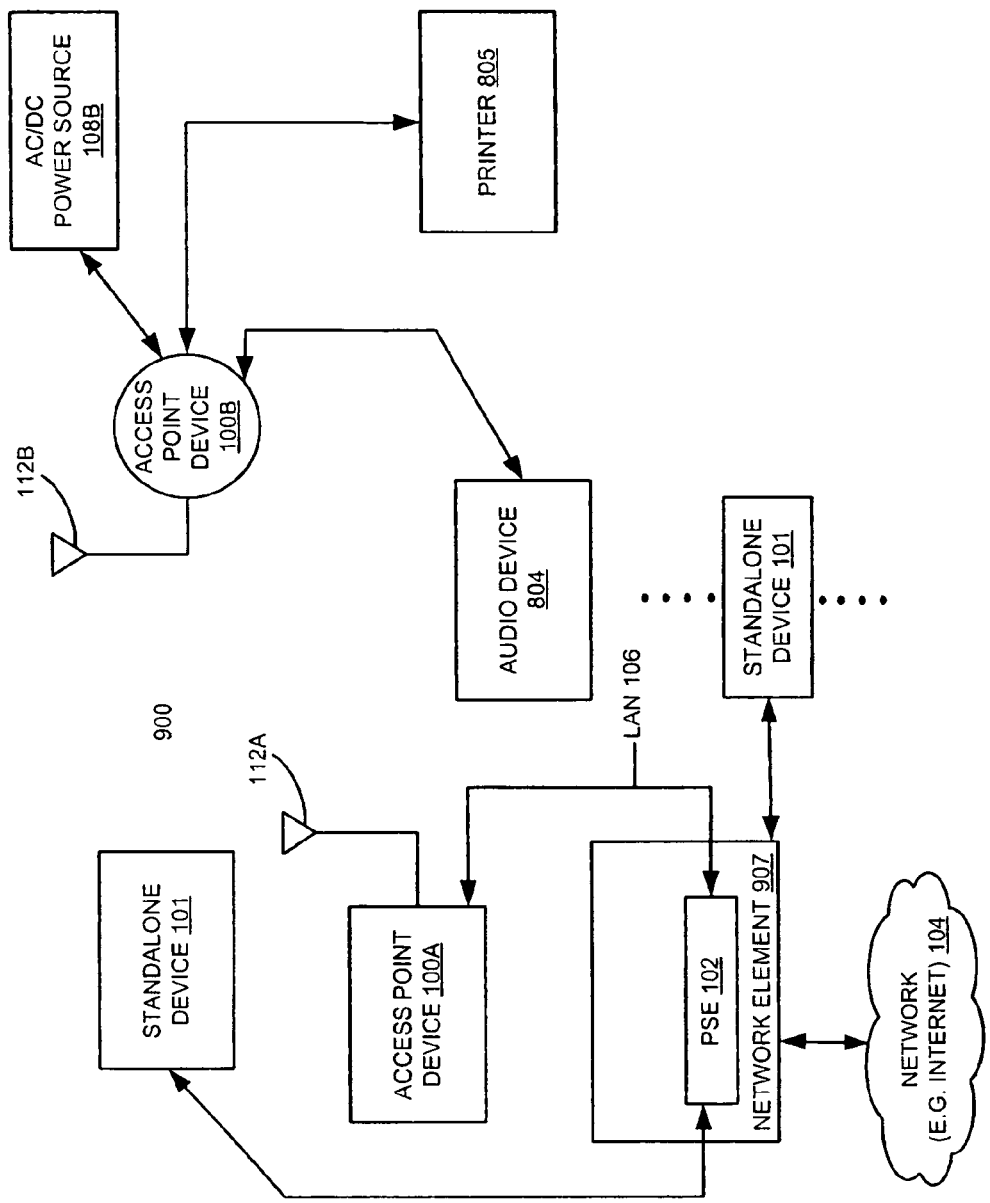
FIG. 9 is a system diagram illustrating a network element housing a power sourcing equipment that delivers power (e.g., through a network medium such as an Ethernet cable) to the access point device and to standalone devices, according to one embodiment.

FIG. 9 is a system diagram 900 illustrating the network element 907 housing a power sourcing equipment 102 that delivers power to the access point device 100A and to multiple ones of the standalone devices 101, according to one embodiment. The network element 907 may be a DSL and/or cable modem or router. The access point device 100A includes an antenna 112A that allows the access point device 100A to communicate with another access point device 100B. The access point device 100B communicates with the access point device 100A using an antenna 112B on the access point device 100B

The power sourcing equipment 102 of FIG. 9 may deliver power to any number of the standalone device 101 as well as to any number of the access point device 100. Illustrated in FIG. 9, the access point device 100A may receive power and data from the power sourcing equipment 102 through a local area network 106. In contrast, the access point device 100B may receive power from a local power source, namely the AC/DC power source 108B, and data through the wireless network formed by the antennas 112A and 112B of the access point device 100A and the access point device 100B respectively.

The access point device 100B is illustrated as being connected to an audio device 804 and a printer 805. In one embodiment, the access point device 100B may be connected to any type of I/O device (e.g., printer, scanner, smoke detector, etc.) internal and/or external to the access point device 100B. Alternatively, various I/O devices may be integrated within the access point device 100B.

Figure 10:
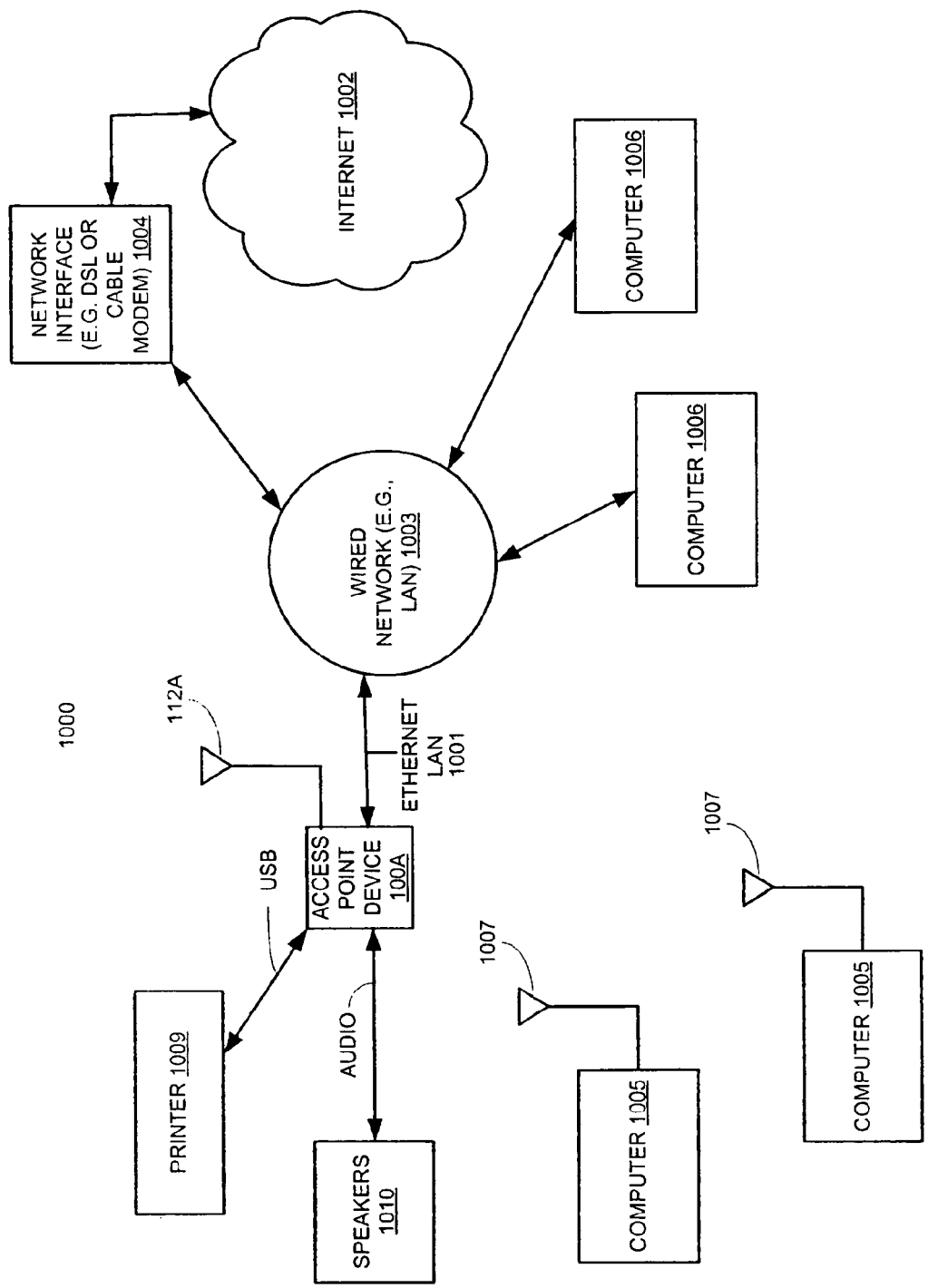
FIG. 10 is a network view of the access point device connected to a wired network to enable a group of computers of the wired network to communicate with another group of computers communicating through the access point device, according to one embodiment.

FIG. 10 is a network view of the access point device 100A connected to a wired network 1003 to enable a group of computers 1006 of the wired network to communicate with another group of computers 1005 communicating through the access point device 100A, according to one embodiment. As shown in FIG. 10, the access point device 100A is connected to the Internet 1002 through a wired network 1003, for example, LAN that includes computers 1006. As shown in FIG. 10, the wired network 1003 is connected to the Internet 1002 through the network interface 1004, for example, DSL and/or cable modem. In one embodiment, the network interface 1004 may include the power sourcing equipment 102, and deliver power to the access point device 100A through the LAN 1001. Further, as shown in FIG. 10, a wireless network of the computers 1005 having wireless interfaces 1007 is formed by the access point device 100A through an antenna 112A. Further, as shown in FIG. 10, the access point device 100A is connected through a USB connection to a printer 1009 and through an audio port to speakers 1010, such that the printer 1009 and speakers 1010 can be shared among computers 1005 and 1006.

Figure 11:
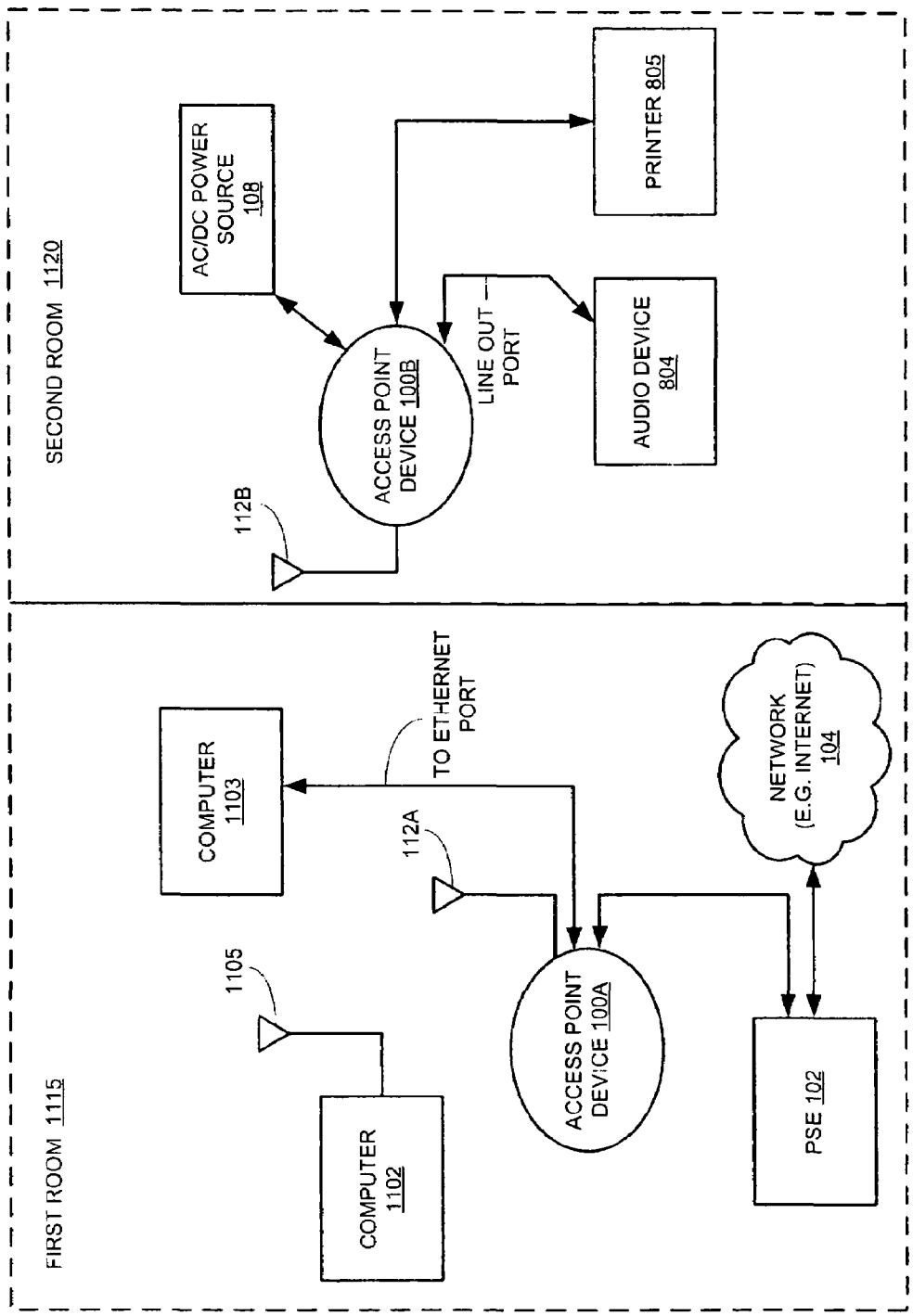
FIG. 11 is a network view of the access point device in a first room communicating with another access point device in a second room, according to one embodiment.

FIG. 11 is a network view of the access point device 100A in a first room 1115 communicating with another access point device 100B in a second room 1120, according to one embodiment. The access point device 100B located in the second room 1120 communicates with a network of computers 1102 and 1103 located in the first room 1115 using an antenna 112B. In FIG. 11, the access point device 100A receives power and data from the network 104 through the power sourcing equipment 102. Furthermore, similarly as described in FIG. 9, the access point device 100B of FIG. 11 may have coupled to it the audio device 804 and or the printer 805.

Figure 12:
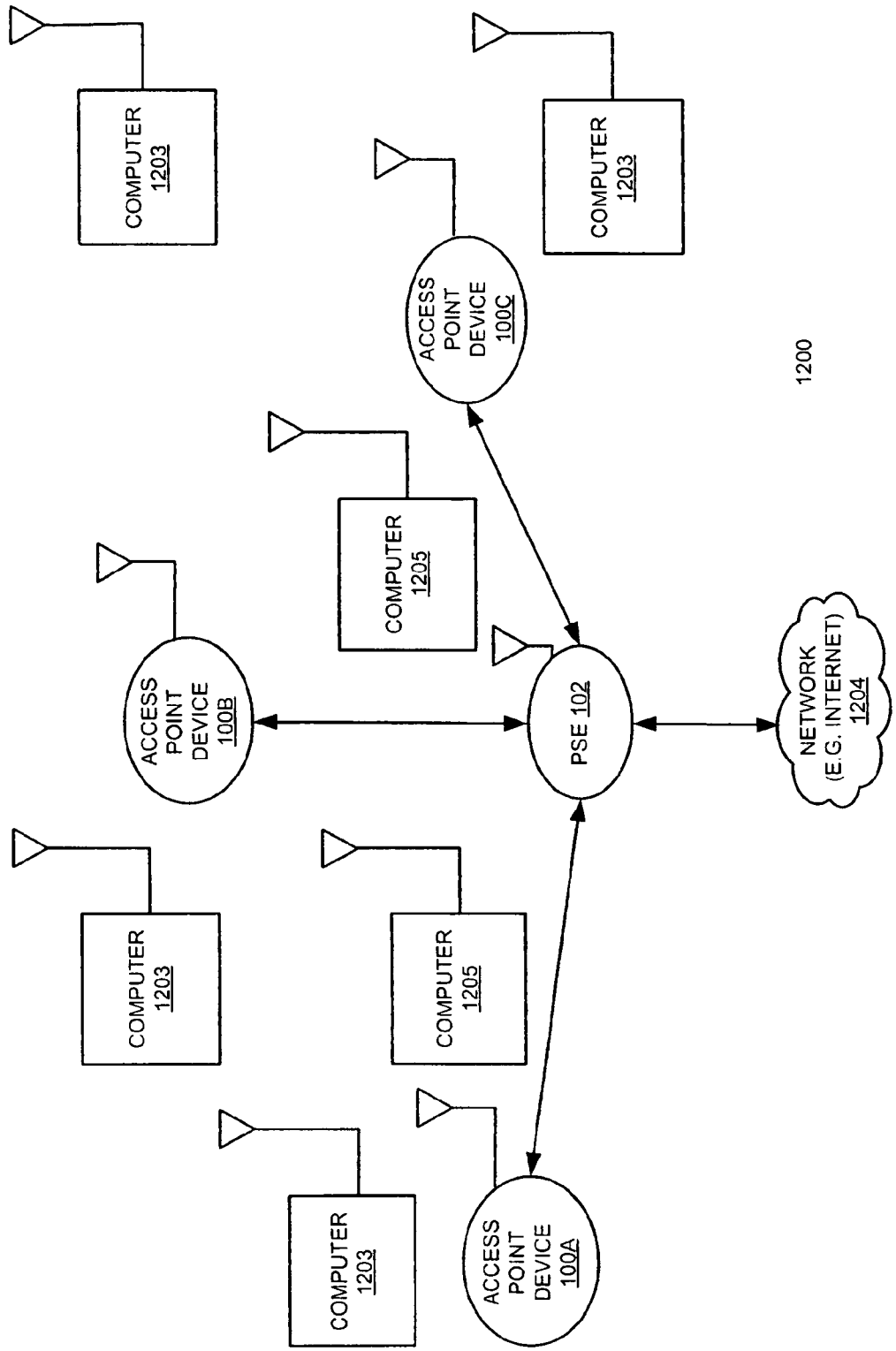
FIG. 12 is a network view of a set of access point devices communicating with a set of other access point devices and with a set of computers, according to one embodiment.

FIG. 12 illustrates the access point device 100A, the access point device 100B, and an access point device 100C all receiving power through the power sourcing equipment 102, while communicating amongst each other either through the power sourcing equipment 102 and/or wirelessly through their respective antennas. In FIG. 12, computers 1203 may communicate with wirelessly the access point device 100A, whereas computers 1205 may communicate wirelessly with the access point device 100B formed by their respective wireless antennas and the power sourcing equipment 102. The computers 1203 and 1205 may communicate wirelessly with each other through a bridging between the access point device 100A and the access point device 100B. In one embodiment, the power sourcing equipment 102 may be a part of a network element, such as the network element 907 illustrated in FIG. 9.

FIG. 13 is a network view of the access point device 100A in a first building 1315 communicating with another access point device in a second building 1320, according to one embodiment. As shown in FIG. 13, the access point device 100A operates as a base station in the first building 1315 and creates a network by establishing a wireless connection to the computers 1303 and 1304 and a wired Ethernet LAN connection to the computer 1305 (e.g., the computer 1305 may be any type of data processing system). As shown in FIG. 13, the access point device 100A bridges wirelessly to the access point device 100B located in the second building 1320. The access point device 100B operates as a base station in the second building 1320 connecting wirelessly a plurality of computers 1308. The access point device 100A, as shown in FIG. 13, may connect to a printer 1306 through a USB connection, such that the printer 1306 is shared among computers 1303, 1304, 1305, and/or 1308, which are located in different buildings.

Figure 14:
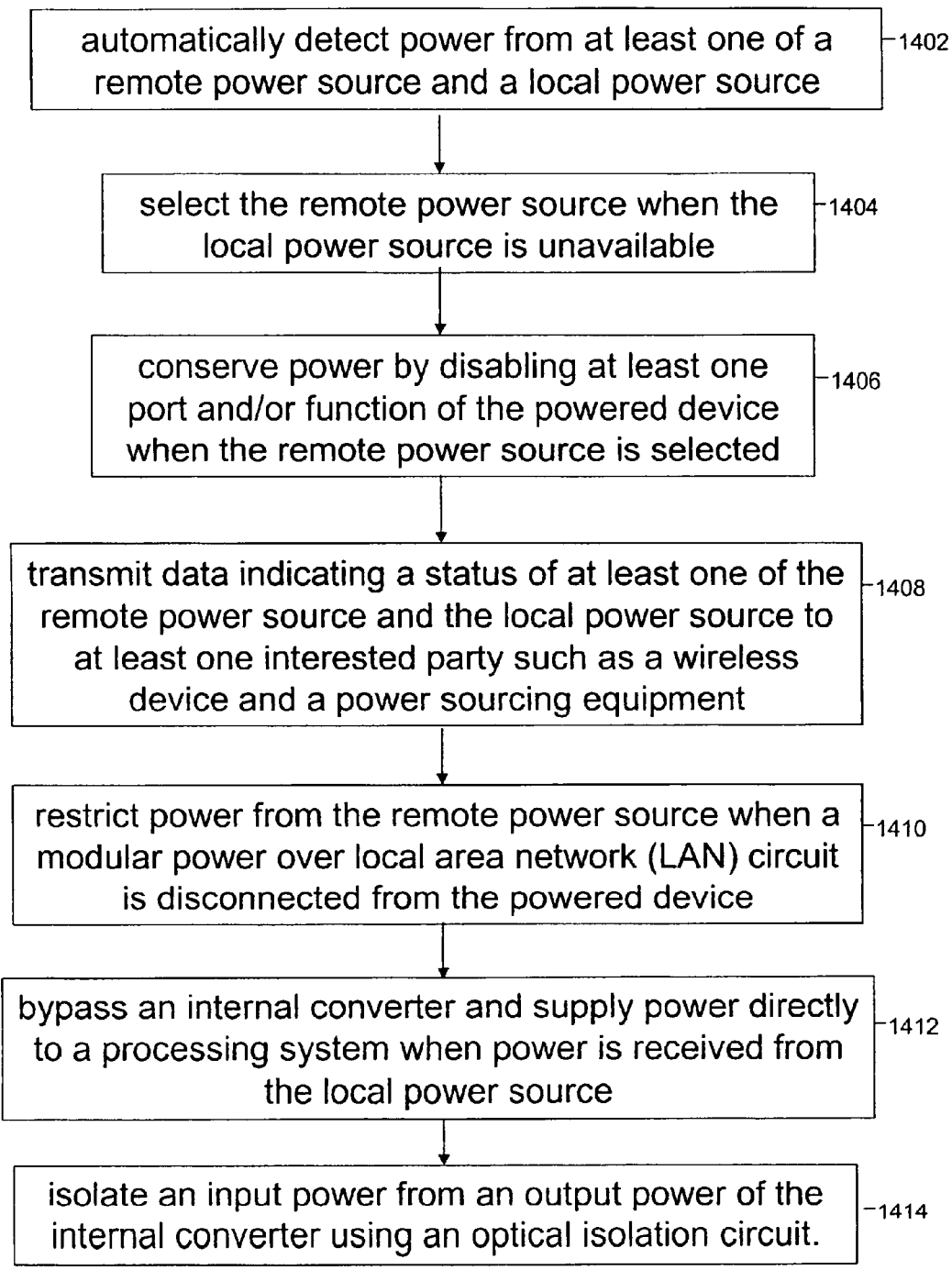
FIG. 14 is a process flow of a powered device to enable automatic management of a network powered device, according to one embodiment.

FIG. 14 is a process flow of a powered device (e.g., the access point device 100 and/or the standalone device 101) to enable automatic power management of a network powered device, according to one embodiment. In operation 1402, a powered device may automatically detect power from at least one of a remote power source (e.g., the power sourcing equipment 102) and a local power source (e.g., the AC/DC power source 108 and/or a battery). In operation 1404, the powered device may select the remote power source when the local power source is unavailable and power is available from the remote power source (e.g., as previously described in detail in FIG. 2A). In operation 1406, the powered device may conserve power by disabling (e.g., in alternate embodiments may "enable" one or more subsystems depending on the power source) at least one function or portion of the circuitry of the powered device when the remote power source is selected (e.g., to conserve power, because sometimes the remote power source may not be able to supply enough power to the optionally powered subsystem 218 while allowing the powered device to operate normally). In one embodiment, the operating state of the processing system 220 of FIG. 2A may be changed based on the power source (e.g., run at a higher clock rate when local power is available). In operation 1408, the powered device may optionally transmit data indicating a status of at least one of the remote power source and the local power source (e.g., a status indicating whether the remote power source or the local power source is supplying power to the powered device) to at least one interested party such as a wireless device 114 and a power sourcing equipment 102.

Next, in operation 1410, the powered device may restrict power from the remote power source when a modular power over local area network (LAN) circuit is disconnected from the powered device (e.g., as previously described in FIG. 2A). Then, in operation 1412, the powered device may disable an internal converter (e.g., the LAN power DC-DC converter 208 may be disabled thereby saving parasitic power) and supply power directly to a processing system when power is received from the local power source. (e.g., if the local power source has the same voltage requirements of the internal primary power bus 200 as previously described in FIG. 2A). In operation 1414, an optical isolation circuit 206 as described in FIG. 2A may be used to isolate an input power from possible high voltages of the internal converter (e.g., the LAN power DC-DC converter 208).

In one exemplary embodiment, a wireless network device (e.g., the access device 100) may include a port to couple to a wired data network (e.g., the LAN 106), the port being capable of receiving power from the wireless network device (e.g., the access device 100); a detector circuit (e.g., the power source detection and control circuit 202) coupled to the port, the detector circuit to detect whether power is available from a source which is different than the wired data network to power the wireless network device; and a receptor to receive a removable circuit (e.g., the part of the access point device 100 connecting to the modular power over LAN circuit 210) through which power from the wired data network (e.g., the LAN 106) is delivered to the wireless network device, (e.g., the access device 100) the receptor being coupled to the detector circuit. In addition, a wireless network device may be a wireless router which is capable of transmitting and receiving data wirelessly to and from wireless devices which comprise a data processing system and wireless transceivers. Furthermore, the removable circuit (e.g., the modular power over LAN module 210) may receive a signal from the detector circuit. The signal may cause the removable circuit (e.g., the modular power over LAN module 210) to consume less power when power is available from the source which is different than the wired data network and wherein the removable circuit converts power from the wired data network for use in the wireless network device.

It should be noted that the various embodiments having modules, circuits, systems, subsystems, processors, and electronics described herein may be performed within hardware circuitry (e.g., logic circuitry such as CMOS based circuitry) as well as in software (e.g., through machine-implemented methods and/or through machine-readable mediums). Specifically, it should be noted that an electrical architecture for the access point device 100 and the standalone device 101 (e.g., collectively "powered devices") of FIGS. 1-14 can be implemented in some embodiments with one or more semiconductor devices including circuitry such as logic circuitry to perform its various functions as described above, in addition to being implemented in software. In some embodiments, hardware circuitry may provide speed and performance advantages over software implementations of the report generator module 226 of FIG. 2A and FIG. 2B. In other embodiments, software implementations may be preferred. In one embodiment, the report generator module 226 may be designed using a passive matching circuit, a report generator circuit, and/or any combination of these circuits, and may be built with semiconductor circuitry (e.g., logic circuitry such as CMOS based circuitry). A semiconductor chip may implement the functions (e.g., as described in FIG. 1 thru FIG. 14)

described within the various embodiments using logic gates, transistors, and hardware logic circuitry associated with implementing the various embodiments disclosed herein.

In the foregoing specification, the embodiments have been described with reference to specific exemplary embodiments thereof. It will be evident that various modifications may be made thereto without departing from the broader spirit and scope of the embodiments as set forth in the following claims. The specification and drawings are, accordingly, to be regarded in an illustrative sense rather than a restrictive sense.

What is claimed is:

1. A system to deliver power, comprising:
   a power sourcing equipment to process data of an interconnected network and to receive power from a first power source coupled to the power sourcing equipment;
   a powered device coupled at a distance away from the power sourcing equipment through a local area network (LAN) to process the data of the interconnected network through the power sourcing equipment;
   a power over LAN circuit to enable power to the powered device through the LAN when the power over LAN circuit is coupled to the powered device, wherein the powered device comprises a power source detection and control circuit to transmit a LAN power disable control signal to an isolation circuit to reduce use of power received through the LAN, when power is received through a local power source.

2. The system of claim 1, further comprising an optionally powered subsystem to alter at least one function of the powered device when the powered device receives power through the LAN.

3. The system of claim 1, wherein the powered device to draw power from the local power source when the power over LAN circuit is not coupled to the powered device.

4. The system of claim 1, further comprising a report generator module of the powered device to create at least one detailed summary report of activity monitored by the power source detection and control circuit, wherein the at least one detailed summary report being transmittable to at least one interested party.

5. The system of claim 1, wherein the power over LAN circuit further comprises a converter coupled to the power source detection and control circuit to transform an input voltage to an output voltage when the power over LAN circuit is coupled to the powered device and when power is received through the LAN.

6. The system of claim 5, further comprising an optical isolation circuit of the powered device to control the operation of the converter.

7. The system of claim 5, wherein the converter is disabled when power is received through the local power source.

8. An apparatus, comprising:
   a power source detection and control circuit to transmit a local area network (LAN) power disable control signal to a isolation circuit to reduce use of power received through a LAN when power is received through a local power source;
   a converter coupled to the isolation circuit to transform an input voltage to an output voltage when a power over LAN circuit is coupled to the apparatus and when power is received through the LAN; and
   a powered subsystem to disable power to at least one port of the apparatus when the power over LAN circuit is coupled to the apparatus and when power is received through the LAN.

9. The apparatus of claim 8, further comprising:
   a wireless transmitter circuit to transmit data between a processing system coupled to the LAN and at least one wireless device.

10. The apparatus of claim 9, wherein the wireless transmitter circuit to deliver at least one status report generated by a report generator module of the apparatus to the at least one wireless device.

11. The apparatus of claim 8, wherein the converter is disabled and power is directly supplied to a processing system when power is received through the local power source.

12. The apparatus of claim 8, wherein the isolation circuit is an optical isolation circuit which controls the operation of the converter.

13. The apparatus of claim 8, wherein the apparatus to draw power from the local power source when the power over LAN circuit is not coupled to the apparatus.

14. The apparatus of claim 13, wherein power is supplied through the LAN from a remote power source when the power over LAN circuit is coupled to the apparatus and the local power source is unavailable.

15. A method of managing power of a powered device, comprising:
   automatically detecting power from at least one of a remote power source and a local power source;
   selecting the remote power source when the local power source is unavailable;
   conserving power by disabling at least one function of the powered device when the remote power source is selected, and
   transmitting a remote power source disable control signal to reduce use of power received from the remote power source when power from the local power source is detected.

16. The method of claim 15, further comprising transmitting data indicating a status of at least one of the remote power source and the local power source to at least one interested party.

17. The method of claim 16, wherein the at least one interested party is at least one of a wireless device and a power sourcing equipment.

18. The method of claim 15, further comprising restricting power from the remote power source when a modular power over local area network (LAN) circuit is disconnected from the powered device.

19. The method of claim 15, further comprising disabling an internal converter and supplying power directly to a processing system when power is received from the local power source.

20. The method of claim 19, further comprising isolating a user from contact when the local power source is connected.

21. A machine-readable medium having instructions to cause a machine to perform a machine-implemented method of managing power of a powered device, the method comprising:
   automatically detecting power from at least one of a remote power source and a local power source;
   selecting the remote power source when the local power source is unavailable;

conserving power by disabling at least one function of the powered device when the remote power source is selected, and transmitting a remote power source disable control signal to reduce use of power received from the remote power source when power from the local power source is detected.

22. An apparatus to manage power of a powered device, the apparatus comprising:

means for automatically detecting power from at least one of a remote power source and a local power source;

means for selecting the remote power source when the local power source is unavailable;

means for conserving power by disabling at least one function of the powered device when the remote power source is selected; and means for transmitting a remote power source disable control signal to reduce use of power received from the remote power source when power from the local power source is detected.

23. A system to manage power of a powered device comprising:

a processing unit coupled to a memory through a bus; and a process executed from memory by said processing unit to cause said processing unit to:

automatically detect power from at least one of a remote power source and a local power source;

select the remote power source when the local power source is unavailable;

conserve power by disabling at least one function of the powered device when the remote power source is selected, and transmit a remote power source disable control signal to reduce use of power received from the remote power source when power from the local power source is detected.

24. A wireless network device comprising:

a port to couple to a wired data network, the port being capable of receiving power from the wired data network for use by the wireless network device;

a detector circuit coupled to the port, the detector circuit to detect whether power is available from a source which is different than the wired data network to power the wireless network device, wherein the detector circuit is to transmit a network power disable control signal to reduce use of power received from the wired data network when power from a local power source is detected; and a circuit through which power from the wired data network is delivered to the wireless network device, the circuit being coupled to the detector circuit.

25. A wireless network device as in claim 24, wherein the wireless network device is a wireless router which is capable of transmitting and receiving data wirelessly to and from wireless devices which comprise a data processing system and wireless transceivers.

26. A wireless network device as in claim 24 wherein the circuit receives a signal from the detector circuit.

27. A wireless network device as in claim 26 wherein the signal causes the circuit to consume less power when power is available from the source which is different than the wired data network and wherein the removable circuit converts power from the wired data network for use in the wireless network device.

* * * * *